N. HULL.
Plow.
No. 2,620.
Patented May 12, 1842.
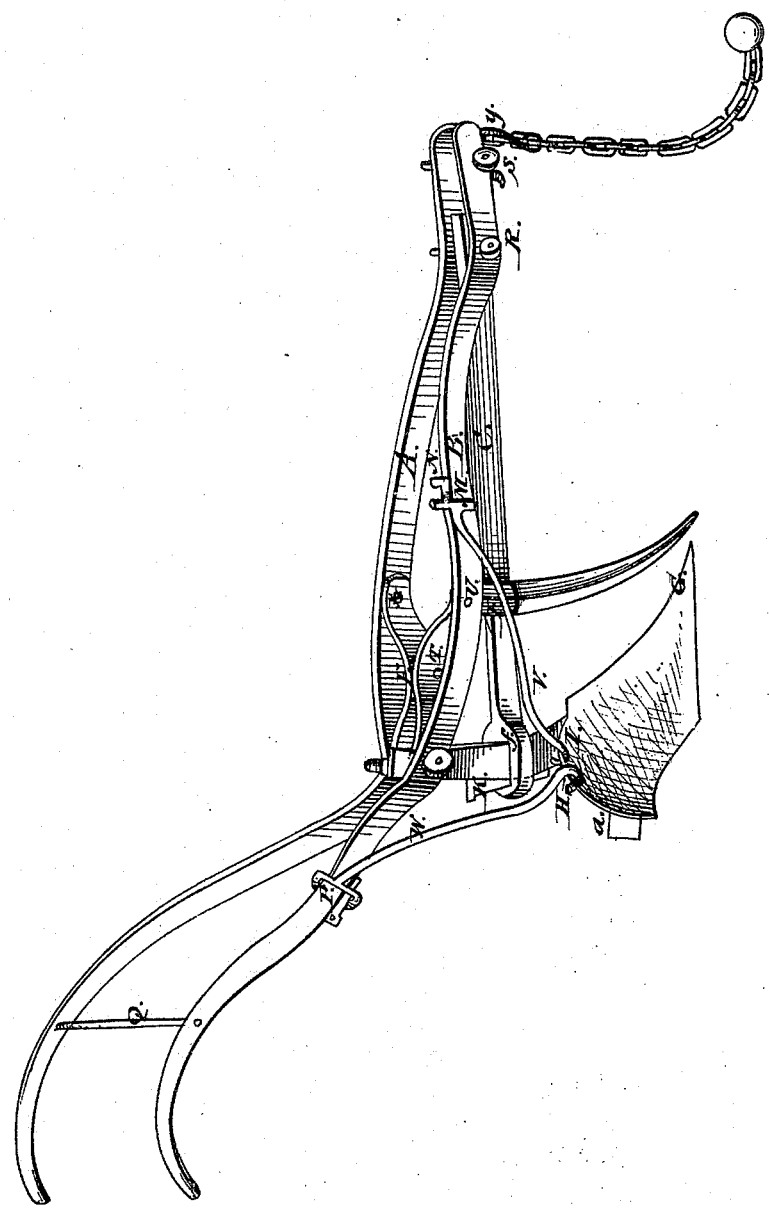

UNITED STATES PATENT OFFICE.

NATHAN HULL, OF DE KALB, MISSISSIPPI.

IMPROVEMENT IN PLOWS.

Specification forming part of Letters Patent No. 2,620, dated May 12, 1842.

*To all whom it may concern:*

Be it known that I, NATHAN HULL, of De Kalb, in the county of Kemper and State of Mississippi, have invented a new and useful Improvement on the Mode of Altering the Set of Iron Plows to and from Land; and I do hereby declare that the following is a full, true, and exact description of the construction and application of said improvement, reference being had to the annexed drawing, making a part of this specification, in which—

Figure 1 is a perspective view.

The nature of my invention consists in constructing a plow-frame with an open beam composed of three pieces of iron with a center brace of four points and two side braces attached by hooks to the upper part of the share or hoe of the plow, and moving by sliding loops, one on the beam, the other on the plow-handle, and also a screw passing through the upright of the share and the side pieces of the beam at the point where the handles diverge therefrom, by loosing which screw the upright of the share is freed from pressure and the sliding of the braces both in one direction the point of the plow is changed horizontally in the opposite direction.

To enable others skilled in the art to construct and use my invention, I will proceed to describe its construction and operation, and shall refer to drawing Fig. 1, as above noted.

For a plow of two-horse draft I forge two bars of iron five feet four inches long and one inch by three-eighths thick, letters A and B. These bars I bend to the shape of a beam and handles of an ordinary-shaped plow. These bars form the open beam and the handles, being so bent outward at the center of the beam as to leave an open space of four inches. In this space I place a four-pointed spring-steel brace, E, which is constructed of two pieces of steel welded or riveted at the center, T, and each several point bent divergingly so as to rest against the side bars, A and B. Each arm of this brace is one inch by one-fourth. The forward points I make fast to the side bars by rivets X and U. Through the back points holes are made corresponding with holes through the side bars, and also with a hole through the upright of the share, through all which holes I pass a screw-bolt, L, the side bar, A, forming the screw-top in working the same.

The third bar, C, forming a part of the beam, I make of iron one and one-fourth inch by one-half inch, twenty-seven and one-half inches in length. This bar is connected with the side bars, A and B, by means of a screw-pin, R, which passes through a hole in the forward end of said bar corresponding with holes in the side bars, A, forming the top. At the other end of this bar a loop is constructed, J, which encompasses and slides upon the upright of the share D, and receives a wedge of iron, K, on the back side. This bar, resting between the side bars and moving about the screw-pin R as an axle, can be placed and fastened by the wedge K at any point on the upright D. On this bar C, I place a sliding colter, cutter, or other forerunner of the share, which, by means of a hole or loop and wedge, F, can be moved and stationed forward or back.

Through the points of the side bars, at the distance of one inch from the end, I pass a screw-pin, S, A forming the top in such manner as to leave an open space between the points of said bars of one inch. To this pin any manner of gear may be attached, as a hook and chain, Y, or other instrument suited to a clevis.

On the mold side of the plow I place two braces of round iron one-half inch in diameter, eighteen inches in length, V W, with hooks at one end, H I, which pass through holes made for the purpose in the upper part of the wing or mold of the share three inches apart, as at H I. At the other end of each of these braces a loop is formed, M and P, which encompasses and slides upon the side bar of the frame B, and receives wedges N and O, by which they can be made fast. I place a round iron brace, Q, through the handles nine inches from their points, seventeen inches in length.

A plow thus constructed is best adapted to the use of my improvement.

In performing the operation of altering the set of a plow thus constructed the plowman first draws the wedges N K O, then by turning screw-bolt L backward the center brace, E, will cause the side bars, A and B, to open until the share-point G will move freely, then by pressing the share-point (on letter G) it will move to land, while the heel of the share $d$ will recede from land, at which motion brace V will slide on side bar, B, in a direction from U to B, and brace W will slide on the same toward letter L. When the point G has reached the position desired the wedges N K O are made fast and the screw L turned forward until the upright D becomes firmly pressed by the contraction of the spring and side bars, when the point becomes firm and stationary. The same process is used to alter and set the point from land by pressing the point of the share in the opposite direction.

What I claim as my invention, and desire to secure by Letters Patent, is—

The application of this braced frame to the use and purpose of altering the mode of setting iron plows to and from land.

The remaining portions I hereby disclaim.

NATHAN HULL.

Witnesses:
J. A. MARSHALL,
MALA FOX.